United States Patent
Saito et al.

Patent Number: 5,119,785
Date of Patent: Jun. 9, 1992

[54] INTAKE APPARATUS FOR MULTI-VALVE ENGINE

[75] Inventors: Fumihiko Saito; Noboru Hashimoto, both of Hiroshima, Japan

[73] Assignee: Mazda Motor Corporation, Hiroshima, Japan

[21] Appl. No.: 670,413

[22] Filed: Mar. 15, 1991

[30] Foreign Application Priority Data

Mar. 15, 1990 [JP] Japan .................................. 2-62556

[51] Int. Cl.$^5$ ............................................ F02B 15/00
[52] U.S. Cl. .................................................. 123/432
[58] Field of Search ................ 123/432, 302, 308, 315

[56] References Cited

U.S. PATENT DOCUMENTS

| | | | |
|---|---|---|---|
| 3,334,618 | 8/1967 | Funiciello | 123/432 |
| 3,991,729 | 11/1976 | Notaro | 123/432 |
| 4,519,365 | 5/1985 | Anfusio | 123/315 |
| 4,622,940 | 11/1986 | Yoshikawa | 123/432 |
| 4,932,377 | 6/1990 | Lyle | 123/308 |
| 5,050,557 | 9/1991 | Ishida et al. | 123/308 |

FOREIGN PATENT DOCUMENTS

| | | |
|---|---|---|
| 58-113512 | 7/1983 | Japan . |
| 61-491120 | 3/1986 | Japan .................................. 123/432 |
| 61-215422 | 9/1986 | Japan . |
| 62-34124 | 2/1987 | Japan . |

*Primary Examiner*—David A. Okonsky
*Attorney, Agent, or Firm*—Fleit, Jacobson, Cohn, Price, Holman & Stern

[57] ABSTRACT

An intake system for with an internal combustion engine, having a plurality of intake valves for one cylinder, includes a plurality of intake ports, opening into a combustion chamber, with openings which extend toward one side of the internal combustion engine. At least one exhaust port, opening into the combustion chamber, has an opening which extends toward another side of the engine, and is formed in the cylinder head on the other side, which is opposite to the one side of the internal combustion engine. The intake ports are arranged so that the center intake port is inclined at an angle larger than an angle at which other, side intake ports are inclined, so as to direct fuel mixture flows, introduced through the side intake ports, toward an inner surface of the cylinder bore above a top of the piston at a lower dead point.

8 Claims, 2 Drawing Sheets

INTAKE APPARATUS FOR MULTI-VALVE ENGINE

The present invention relates to an intake apparatus for a multi-valve internal combustion engine, and more particularly, to an intake system for an internal combustion engine having a plurality of intake valves for one cylinder.

BACKGROUND OF THE INVENTION

1. Field of the Invention

Intake and exhaust performance of an internal combustion engine can be improved by increasing what is known as a "valve area", i.e., the total area occupied by intake and exhaust valves in a cross-sectional area of a combustion chamber of each cylinder of the engine. For this reason, a multi-valve internal combustion engine having such intake and exhaust valves is typically provided with more than one exhaust valve and more than one intake valve. To improve the output of such a multi-valve internal combustion engine, however, it is necessary for the intake and exhaust valves themselves to be small in size and light in weight so that they can properly follow and operate throughout various speeds of rotation of the engine. This is particularly important in range of high engine operating speeds.

Such a multi-valve internal combustion engine, known from, for instance, a Japanese patent application entitled "Four Cycle Engine," filed on Dec. 28, 1981, and published as Japanese Unexamined Patent Publication No. 58-113,512 on Jul. 6, 1983, has a drawback in that tumbling, i.e., turbulent, air motion, which generally contributes to stimulating fuel mixture combustion, is interrupted. Considering, as an example, an internal combustion engine having three intake valves for one cylinder, three intake ports are typically arranged so that an intermediate, or center, intake port is closer to a center axis of the cylinder than both side intake ports disposed on opposite sides of the center intake port with respect to the center axis. Such an arrangement of intake ports is usually accompanied by a positional irregularity of valve stems of the intake valves. To eliminate valve drive system complexity due to the positional irregularity of valve stems, the valve stem of the intake valve for the center intake port is inclined at an angle with respect to the center axis of the cylinder which is smaller than angles at which the valve stems of the intake valves for the side intake ports are inclined so that top ends of all the valve stems of the intake valves are on a straight line, parallel to an axis of rotation of a cam shaft of the valve drive system. For this purpose, it is necessary for the center intake port to be inclined at an angle with respect to the center axis of the cylinder which is relatively small as compared to an angle or angles at which the side intake ports are inclined. In the intake system, even if the side intake ports direct a fuel mixture so that it flows toward an inner surface of the cylinder to cause the fuel mixture to tumble or bounce on the inner surface of the cylinder and the top surface of a piston, thereby providing the fuel mixture with a tumbling motion, the tumbling motion of the fuel mixture introduced through the side intake ports will be overwhelmed by a fuel mixture flow introduced through the center intake port which is bounced by the piston and directed against the fuel mixture flow introduced through the side intake ports. In other words, in the conventional intake system, tumbling air motion has not been taken into design considerations.

SUMMARY OF THE INVENTION

It is, therefore, a primary object of the present invention to provide an intake system for a multi-valve internal combustion engine which causes tumbling, or turbulent air motion.

It is another object of the present invention to provide an intake system for a multi-valve internal combustion engine which improves fuel combustion.

These objects are accomplished by providing an intake system for an internal combustion engine having at least a plurality of intake valves and exhaust ports for one cylinder which comprises a cylinder block formed with a cylinder bore, a cylinder head mounted on the cylinder block, and a piston slidably received in the cylinder to form a combustion chamber. The cylinder head is formed with a plurality of, and preferably, at least three, intake ports which open into the combustion chamber. The intake port openings extend toward one side of the internal combustion engine, and at least one exhaust port opens into the combustion chamber and has openings which extend toward another side of the engine, opposite to the one side.

One of the three intake ports, and preferably, the center intake port, is inclined at an angle larger than an angle at which the other two side intake ports are inclined so as to direct fuel mixture flows introduced therethrough toward an inner surface of the cylinder bore above the top of the piston at a lower dead point.

BRIEF DESCRIPTION OF THE DRAWINGS

The above and other objects and features of the present invention will be apparent to those skilled in the art from the following detailed description thereof when considered in conjunction with the accompanying drawings, wherein.

DETAILED DESCRIPTION OF THE PREFERRED EMBODIMENT

Figure 1:
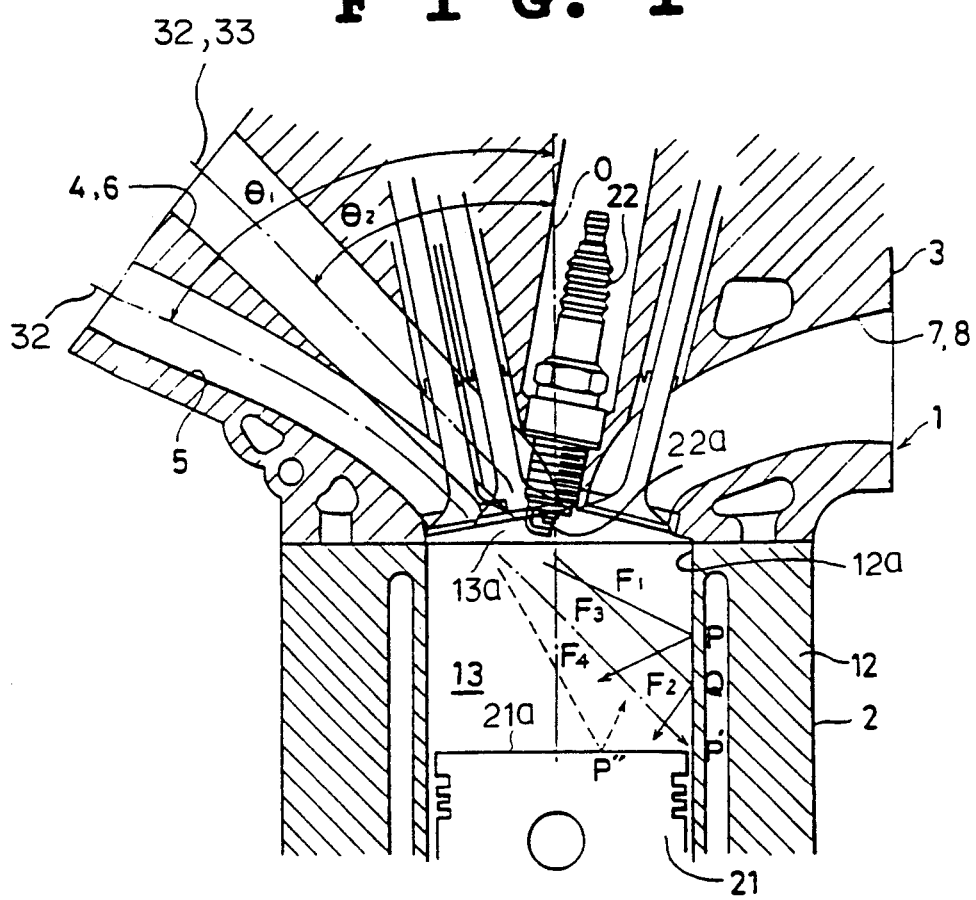
FIG. 1 is a cross-sectional view showing part of a multi-valve internal combustion engine equipped with an intake system in accordance with a preferred embodiment of the present invention.
Figure 2:
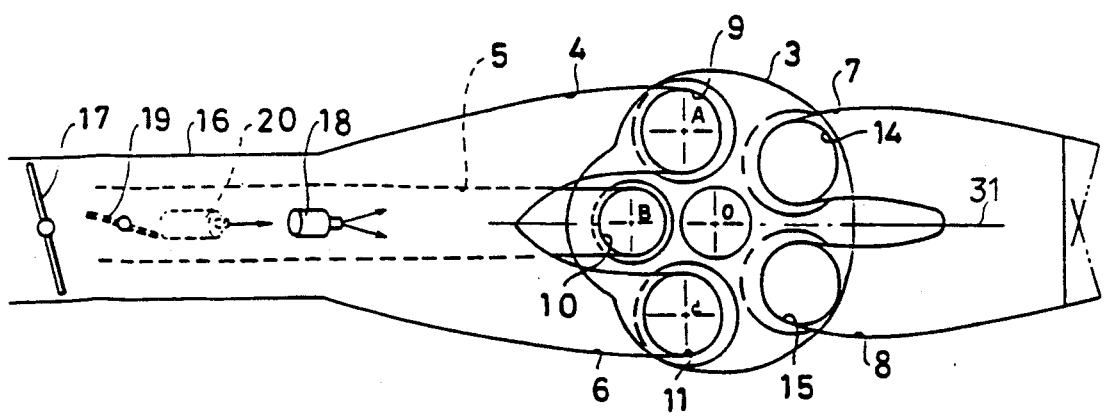
FIG. 2 is a plan view of FIG. 1.

Referring to the drawings in detail, and in particular, to FIGS. 1 and 2, an internal combustion engine 1 with an intake system in accordance with a preferred embodiment of the present invention is shown, and includes an engine block 2 and an cylinder head 3. The engine block 2 is provided with a plurality of cylinders 12 formed with cylinder bores 13 (one of which is shown). Each cylinder bore 13 receives therein a piston 21 for reciprocating sliding movement. The cylinder head 3 is mounted on the engine block 2. Combustion chamber 13a is formed in each cylinder 12 by the top of the piston 21, a lower wall of the cylinder head 3 and the cylinder bore 13. The cylinder head 3 is formed with first, second and third intake ports 4, 5 and 6, with openings which extend toward one side of the engine 1, for each cylinder 12. Further, the cylinder head 3 is formed with first and second exhaust ports 7 and 8, having openings which extend to another side of the engine 1, for each cylinder 13. The intake ports 4, 5 and 6 and exhaust ports 7 and 8 are opened and shut at a predetermined timing by first to third intake valves 9, 10 and 11 and exhaust valves 14 and 15. The cylinder head 3 has a bore 30 opening into each cylinder 13 for receiving therein a spark plug 22. The bore 30 is directed so as to locate an electrode tip 22a of the spark plug 22 downwardly and within the combustion chamber 13a so that it intersects a vertical center line, or axis, Q of the cylinder bore 13. The first and third intake valves 9 and 11 are arranged on both sides of the second intake valve 10, and symmetrically with respect to a center line 31 passing through the center B of the second intake port 5 and the vertical center line Q of the cylinder bore 13 as viewed in FIG. 2. In this sense, the second intake port 5 is referred to as a center intake port, and both the first and third intake ports 4 and 6 are referred to as side intake ports. Further, the center B of the second intake port 5 is positioned away from the vertical center line 0 of the cylinder bore 13 at a distance which is shorter than the distance at which the centers A and C of the first and third intake ports 4 and 6 are positioned away from the vertical center line O. In addition, the center B of the second intake port 5 and the vertical center line of the cylinder bore 13 are on opposite sides with respect to a line interconnecting the centers A and C of the first and third intake ports 4 and 6.

The center intake port 5 has a lengthwise center line 32 inclined about an angle $\theta 1$ with respect to the vertical center line O of the cylinder bore 13a. The side intake ports 4 and 6 have lengthwise center lines 32 and 33 inclined about an angle $\theta 2$, smaller than the angle $\theta 1$, with respect to the vertical center line O of the cylinder bore 13a. The two side intake ports 4 and 6 join together at a position near the combustion chamber 13a as an integrated side intake port 16. The center intake port 5 is, however, isolated from the side intake ports 4 and 6 and the integrated side intake port 16. The side intake ports 4 and 6 and the integrated side intake port 16 are located vertically above the center intake port 5 throughout their lengths.

The integrated side intake port 16 is provided therein with a shutter valve 17 for opening and shutting the integrated side intake port 16, and a fuel injector 18, located downstream of the shutter valve 17, for injecting fuel into both of the side intake ports 4 and 6. The center intake port 5 is provided therein with a shutter valve 19 for opening and shutting the center intake port 5, and a fuel injector 20, located downstream of the shutter valve 19, for injecting fuel into the center intake port 5.

The angles $\theta 1$ and $\theta 2$ are determined so as to direct a fuel mixture flow F2 from each side intake port 4 or 6 toward a point O of an inner wall 12a of the positioned above the upper surface 21a of the piston 21 at its lower dead point, shown in FIG. 1, and a fuel mixture flow F1 from the center intake port 5 toward a point P of the inner wall 12a of the cylinder 12, above the point O. The intake ports 4, 5 and 6, thus formed, make it possible for the fuel mixture flows F1 and F2 to interfere less with each other, and for the fuel mixture flows F1 and F2 to travel to the inner wall 12a of the cylinder 12 and, after being bounced off by the inner wall 12a of the cylinder 12 to the upper surface 21a of the piston 21, to form tumbling air motion within the cylinder 2. By comparison, if the angles $\theta 1$ and $\theta 2$ are determined so as to direct fuel mixture flow F3 from the center port 5 towards corner P', between the inner wall 12a of the cylinder 12 and the upper surface 21a of the piston 21 at its lower dead point as is shown in FIG. 1, the fuel mixture flow F3 would linger around the corner P', and a fuel mixture flow F4 from the side intake port 4 or 6 would be bounced off of the upper surface 21a of the piston 21 at a point PΔ, so as to be directed against the fuel mixture flow F3, bouncing off of the inner wall 12a of the cylinder 12. Such a fuel mixture flowing pattern causes less tumbling air motion.

Because the center B of the center intake port 5 is positioned closer to the center line O of the cylinder bore 13 than the centers A and C of the side intake ports 4 and 6, the point P, toward which the fuel mixture flow F1 is directed, is located higher than a point at which a center intake port at the same distance from the center line O of the cylinder bore 13 as the side intake ports 4 and 6, and at the same angle of inclination of the center intake port 5, would be, so as to enhance the creation of tumbling air motion.

The fuel injector 18 in the integrated side intake port 16, which may be of the type having two injection nozzles, is attached to an upper surface of the integrated side intake port 16 so as to distribute fuel into both the side intake ports 4 and 6. The fuel injector 20, which is of the type having a single injection nozzle, is attached to an under surface of the center intake port 5 so as to distribute fuel into the combustion chamber 13a near the center of the cylinder bore 13 through the center intake port 5. This decreases the amount of fuel flowing on the inner wall 12a of the cylinder 12, and thereby decreases the generation of hydrocarbon (HC).

Figure 3:
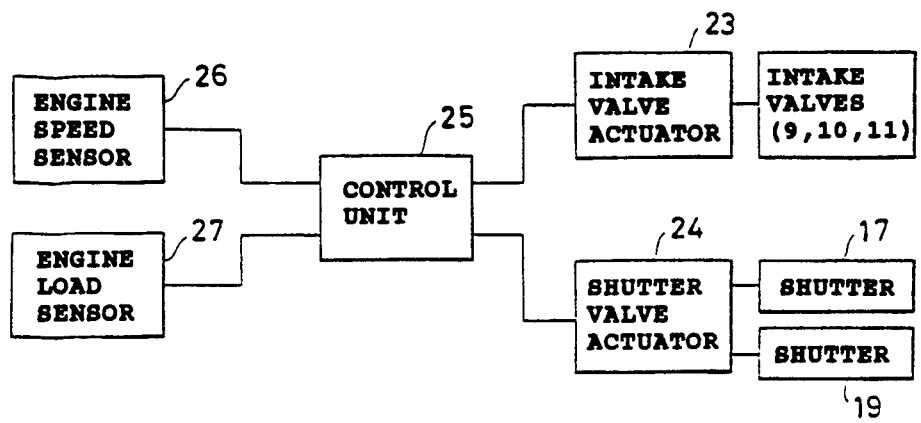
FIG. 3 is a block diagram showing a valve control system.
Figure 4:
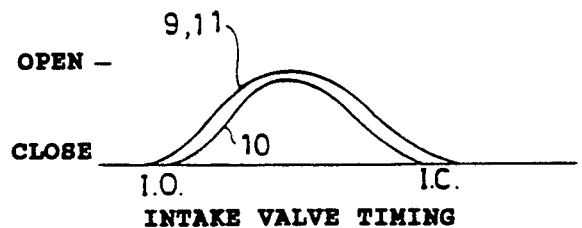
FIG. 4 is a time chart illustrating a timing at which three intake ports are opened and shut by intake valves.

As is diagrammatically shown in FIG. 3, the intake valves 9, 10 and 11 are driven by a conventional electromechanical valve actuator 23 including cams and rocker arms. The shutter valves 17 and 19 are operated by an actuator, such as a conventional negative-pressure controlled, electro-mechanical shutter actuator 24, having a pneumatic diaphragm. The valve actuator mechanism 23, as is shown in FIG. 4, actuates the intake valves 9, 10 and 11 so that opening of the center intake port 5 by the center intake valve 10 is delayed, but closing of the center intake port by the center intake valve 10 is advanced, as compared to opening and closing of the side intake ports 4 and 7, respectively, by valves 9 and 11. The center intake valve 10, thus timed, increases the speed of fuel mixture flow when the engine operates at lower speeds or lower loads and decreases the rate at which the fuel mixture is taken into the combustion chamber 13a of the cylinder 13 through the center intake port 5, so that tumbling air motion is generated strongly by the fuel mixture flow from the side intake ports 4 and 6 and is maintained.

To operate the intake valves 9, 10 and 11 and the shutters 17 and 19 timely, a control unit 25, mainly comprising a general purpose microcomputer, cooperates with the actuators 23 and 24, based on engine operating conditions, such as engine speed and engine load, represented by electric signals generated from an engine sensor 26 and a engine load sensor 27, both sensors being of well known types.

Figure 5:
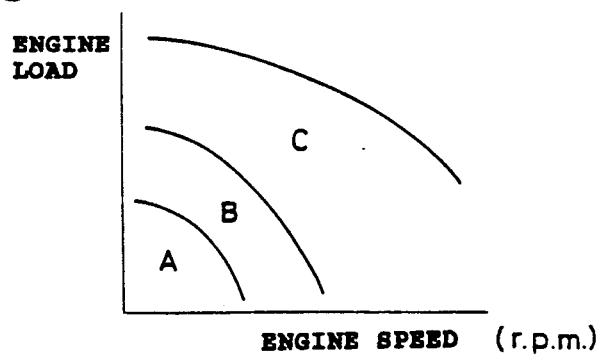
FIG. 5 is a diagram showing valve control ranges for various engine operating conditions.

The operation of the actuators 23 and 24 of the intake system illustrated in FIGS. 1 to 3 is performed according to a control map, shown in FIG. 5, the data of which is stored in the microcomputer of the control unit 25. The control map is provided in order to classify engine operating conditions into three operating ranges according to engine speed and engine load: (1) a low range A, wherein engine speed and engine load are both low, so that a drop is caused in both speed and in the amount of intake air flow, and thereby a drop in kinetic energy is produced; (2) a medium range B, wherein engine speed and engine load are both medium; and (3) a high range B, wherein engine speed and engine load are both high.

The control unit 25, when receiving signals from the engine speed sensor 26 and engine load sensor 27, determines in which range the engine operates among the three ranges A, B and C, with reference to the control map. The control unit 25, when determining that the engine is operating in the low range A of engine operating conditions, in which the intake flow has dropped in speed and amount, and thereby in kinetic energy, causes the shutter actuator 24 to actuate the shutter 19 to open the center intake port 5 only, maintaining the shutter 17 in the integrated side intake port 16 closed. This causes an increase in speed of intake air fed into the combustion chamber 13a so as to improve fuel combustion.

When the control unit determines that the engine is operating in the medium range B of engine operating conditions, the control unit 25 causes the shutter actuator 24 to actuate the shutters 17 and 19 to close the center intake port 5 and open the integrated side intake port 16, and hence, the side intake ports 4 and 6, so as to increase the speed of intake air so that it is higher than when all the intake ports 4, 5 and 6 are open, and to improve fuel combustion by the aid of tumbling air motion generated by the intake air flow from the side intake ports 4 and 6.

The control unit 25, when determining that the engine is operating in the high range A of engine operating conditions, causes the shutter actuator 24 to actuate both the shutters 17 and 19 to open all of the intake ports 4 to 6, thereby allowing a sufficient amount of intake air to be fed into the combustion chamber 13a so as to provide a high power output.

Since tumbling air motion caused by intake air flows from the center intake port 5 and the side intake ports 4 and 6 are vectorially different from each other, turbulence is easily caused at the boundary between tumbling flows from the center intake port 5 and the side intake ports 4 and 6. For this reason, it is preferred to direct fuel flow discharged from the fuel injector 18 in the integrated side intake port 16 through the side intake ports 4 and 6 near the center line 0 of the cylinder bore 13 so as to cause the fuel to become the boundary between the tumble flows. This results in the fuel and air being well mixed around the boundary between the tumbling flows and in speeding up the combustion of the fuel mixture, thereby improving fuel economy and fuel combustion stability.

If it is desired to equip the intake system with an exhaust gas recirculation feature, exhaust gas is introduced into the center intake port 5 and is delivered at a high speed into the cylinder 12, by slightly opening the shutter 19 in the center intake port 5, so as to be agitated and mixed in the cylinder 12.

The side intake ports 4 and 6 may be inclined at different angles from each other, and from the center intake port 5, with respect to the center line of the cylinder bore 13. The side intake ports 4 and 6 may be formed with end openings, opening to the combustion chamber 13a, with different cross-sectional areas, and may be located asymmetrically with respect to the center intake port 5.

It is to be understood that although the present invention has been described in detail with respect to a preferred embodiment thereof, nevertheless, various other embodiments and variants may be apparent to those skilled in the art which are within the spirit and scope of the invention, and such other embodiments and variants are intended to be covered by the following claims.

What is claimed is:

1. An intake system for introducing a fuel mixture into a combustion chamber of an internal combustion engine having a plurality of intake valves for one cylinder, comprising:
    an internal combustion engine having a cylinder block formed with a cylinder bore, a cylinder head mounted on said cylinder block, and a piston slidably received in said cylinder bore to form a combustion chamber;
    at least three intake ports, formed in said cylinder head so as to open into said combustion chamber, said ports each including a opening which extends toward one side of said internal combustion engine, each said intake port being inclined with respect to a vertical center axis of said cylinder bore so as to direct the fuel mixture toward an inner surface of said cylinder bore above a top of said piston when said piston is located at a lower dead point in said cylinder bore; and
    at least one exhaust port, formed in said cylinder head so as to open into said combustion chamber, said exhaust port including an opening which extends toward another side of said internal combustion engine, opposite to said on side of said internal combustion engine.

2. An intake system as recited in claim 1, wherein said at least three intake ports comprise a center intake port and two side intake ports arranged on opposite sides of said center port with respect to said vertical center axis.

3. An intake system as recited in claim 2, wherein said center intake port is inclined at an angle larger than angles at which both said side intake ports are inclined.

4. An intake system as recited in claim 3, wherein said side intake ports are symmetrically arranged on opposite sides of said center intake port with respect to said vertical center axis.

5. An intake system as recited in claim 3, wherein said side intake ports are inclined at different angles from each other.

6. An intake system as recited in claim 3, wherein said side intake ports are joined together, as an integral intake port, near said combustion chamber.

7. An intake system as recited in claim 2, and further comprising valve timing means for driving the intake valves so as to open said center intake port later and shut the center intake port earlier than said side intake ports.

8. An intake system as recited in claim 7, and further comprising separately controlled shutter means disposed in said center and side intake ports, respectively, for opening and shutting said center and side intake ports.

* * * * *